(12) United States Patent (10) Patent No.: US 8,364,770 B2
Ladouceur et al. (45) Date of Patent: Jan. 29, 2013

(54) HETEROGENEOUS NETWORK DELIVERY OF ELECTRONIC MESSAGES IN ACCORDANCE WITH PRIVACY AND PERSONALIZATION CRITERIA

(75) Inventors: David J. Ladouceur, Westminster, CO (US); Michael J. Tracy, Scottsbluff, NE (US)

(73) Assignee: Greenfly America, Inc., Scottsbluff, NE (US)

( * ) Notice: Subject to any disclaimer, the term of this patent is extended or adjusted under 35 U.S.C. 154(b) by 176 days.

(21) Appl. No.: 12/796,606

(22) Filed: Jun. 8, 2010

(65) Prior Publication Data

US 2010/0312842 A1 Dec. 9, 2010

Related U.S. Application Data

(60) Provisional application No. 61/268,074, filed on Jun. 8, 2009.

(51) Int. Cl.
*G06F 15/16* (2006.01)
(52) U.S. Cl. ...................................... 709/206
(58) Field of Classification Search ................... 709/201, 709/206, 225, 229, 232
See application file for complete search history.

(56) References Cited

U.S. PATENT DOCUMENTS

| | | | |
|---|---|---|---|
| 6,057,841 A * | 5/2000 | Thurlow et al. | 715/809 |
| 7,353,258 B2 * | 4/2008 | Washburn | 709/206 |
| 7,752,275 B2 * | 7/2010 | Malik | 709/206 |
| 7,920,583 B2 * | 4/2011 | Millefiorini et al. | 370/412 |
| 2002/0010803 A1 * | 1/2002 | Oberstein et al. | 709/318 |
| 2006/0168064 A1 * | 7/2006 | Huynh et al. | 709/206 |
| 2010/0042511 A1 * | 2/2010 | Sundaresan et al. | 705/26 |
| 2010/0146057 A1 * | 6/2010 | Abu-Hakima et al. | 709/206 |
| 2010/0199188 A1 * | 8/2010 | Abu-Hakima et al. | 715/733 |

* cited by examiner

*Primary Examiner* — Krisna Lim
(74) *Attorney, Agent, or Firm* — Cooley LLP

(57) ABSTRACT

A method of network delivery of electronic messages includes creating an action list from templates corresponding to a group identifier. The templates characterize the structure of a group specified by the group identifier. The structure of the group is specified through roles, permissions and transaction rules for communicating with each individual associated with the group identifier. A message recipient specifies communication preferences for receiving information. Electronic message delivery instructions of the action list are executed for each individual associated with the group identifier. The electronic message delivery instructions specify instructions to be processed by disparate communication networks. The disparate communication networks include at least two of a text messaging network, an instant messaging network, an email network, a cellular network, a social network and the public switched telephone network.

7 Claims, 5 Drawing Sheets

HETEROGENEOUS NETWORK DELIVERY OF ELECTRONIC MESSAGES IN ACCORDANCE WITH PRIVACY AND PERSONALIZATION CRITERIA

CROSS-REFERENCE TO RELATED APPLICATION

This application claims priority to U.S. Provisional Patent Application 61/268,074, filed Jun. 8, 2009, entitled, "Integration of Incompatible Interpersonal Communication Networks with Member Control and Privacy", the contents of which are incorporated herein.

FIELD OF THE INVENTION

The present invention is related to electronic communication networks. More particularly, the invention is directed toward methods for the simplification of social media access and management through the integration of disparate interpersonal communication networks and devices.

BACKGROUND OF THE INVENTION

People and groups attempt to communicate with each other through a great variety of communication technologies, many of which are incompatible. It is unusual that a single communication technology or methodology is used by all members of a group, such as a social or professional network. Typically, communication technology preferences within a group are as diverse as the members of the group. Personal communication preferences may include text messaging, instant messaging (IM), e-mail, cellular voice mail and cellular communications, Twitter™, Facebook™, social network postings, blogs, as well as the public switched telephone network (PSTN).

Today, communicating with all members of a group typically requires that each member use the same application or tool. Alternately, separate communication networks and means may be used to attempt to reach all group members via their communication preferences. This is time consuming, error prone and limits a member's flexibility in changing preferences, as well as their ability to opt-in (choose to participate) and opt-out (choose to not participate) as desired.

Therefore there is a need to be able to communicate through a single point to a group over multiple communication methods or networks that may not be compatible, where individual members of the group manage and maintain specific communication preferences.

SUMMARY OF THE INVENTION

A method of network delivery of electronic messages includes creating an action list from templates corresponding to a group identifier. The templates characterize the structure of a group specified by the group identifier. The structure of the group is specified through roles, permissions and transaction rules for communicating with each individual associated with the group identifier. A message recipient specifies communication preferences for receiving information. Electronic message delivery instructions of the action list are executed for each individual associated with the group identifier. The electronic message delivery instructions specify instructions to be processed by disparate communication networks. The disparate communication networks include at least two of a text messaging network, an instant messaging network, an email network, a cellular network, a social network and the public switched telephone network.

BRIEF DESCRIPTION OF THE DRAWINGS

The present invention can be better understood by reference to the following figures.

DETAILED DESCRIPTION

Figure 1:
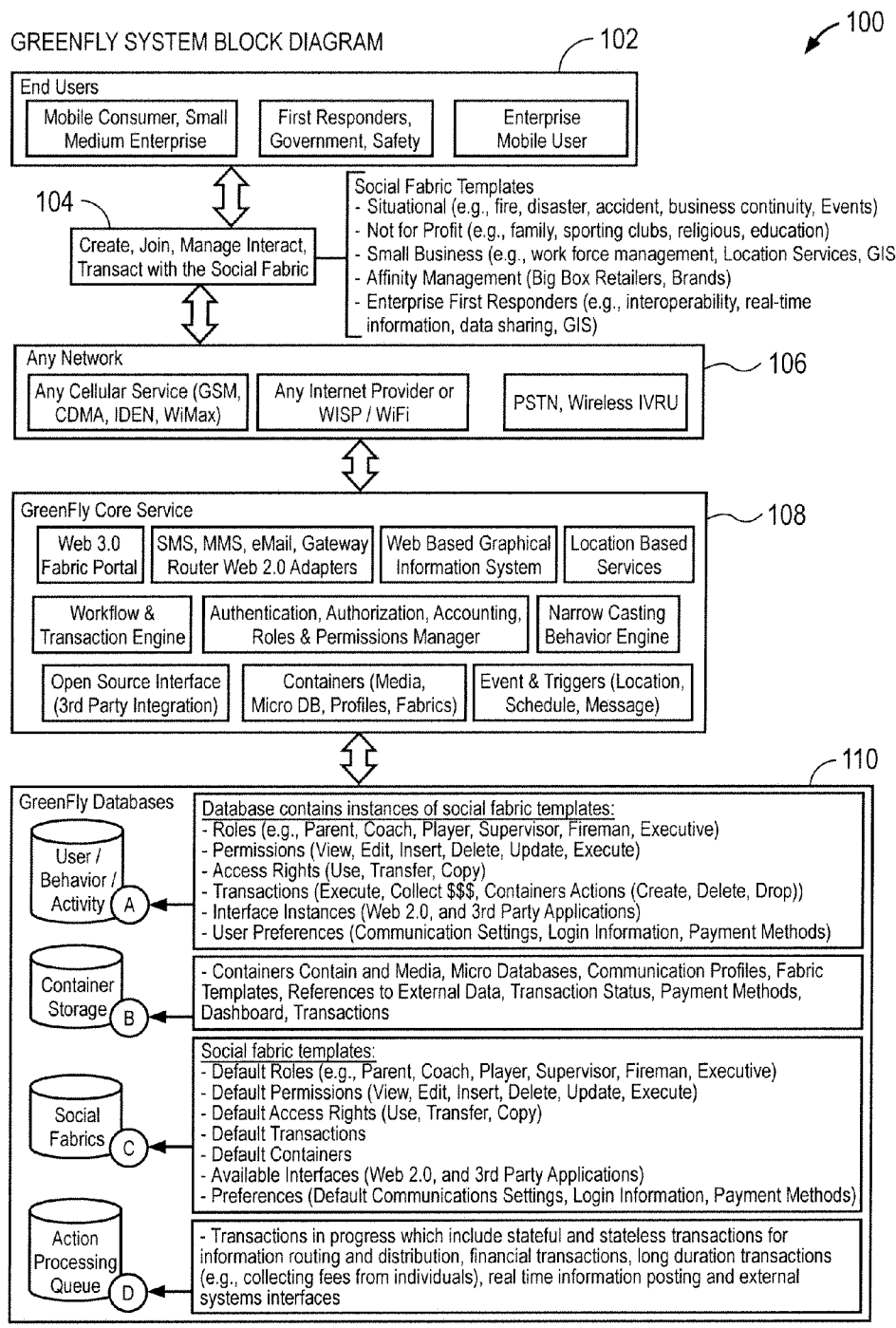
FIG. 1 is a system block diagram of an embodiment of the invention.

The present invention is a system and method for the seamless integration of incompatible interpersonal communication networks. The invention provides the capability to receive, transform, transact and distribute information within an assigned group of people (interpersonal network) utilizing any available wired and wireless networks. Consequently, mobile devices, computers, computer and wireless networks, social networks, and software applications can interact with a member of a network. The network may be a professional network, a personal network, or any other type of interpersonal communication network (IPCN).

The invention employs templates, which are sometimes referred to as social fabric templates. Each template characterizes the structure of a group. The group may be of any form, such as a social network, a business group, a family group, an affinity group, an interest group, or a group responding to an incident, such as a natural disaster. The template includes roles, permissions, access rights, and transaction rules. Roles characterize an individual's status, such as parent, coach, player, supervisor, etc. Permissions express administrative authority, such as view, edit, insert, delete, update, execute, etc. Access rights express data access authority, such as use, transfer, copy, and the like. Transaction rules are executable instructions that specify operations to be performed in connection with a group identifier.

These template items may be expressed at specific database locations called containers. Containers hold specific types of information, such as content, member behavior, directly accessible and indexable databases, communication profiles, templates, references methods to access external data and applications, payment methods, transaction logic, dashboard or aggregate information, available interfaces, and member information and preferences. A container can be thought of as a location where information and intelligence are stored in a social fabric. Various types of containers may be defined, such as content containers, interface containers and transaction containers. Containers may hold data bases, communication profiles, fabric templates, references to external data, transaction information, payment methods, dashboards, and the like.

An embodiment of the invention provides a personalized gateway to transparently connect and send information to members of social, professional and other interpersonal communication networks. The user (member) can manage and maintain specific communication preferences which designate how, where and when the user receives information from specific people or groups. All of this is possible without the sender having knowledge of the receiver's specific communication preferences or devices. The invention provides the ability for members to communicate through a single point to entities or groups utilizing multiple communication networks that may not be compatible, where individual members of the group manage and maintain specific communication preferences. This provides the individual members with privacy, while enabling their accessibility to receive relevant communications and related information.

The invention changes the voice and data communication paradigm from communicating to and from a specific device over a particular communication network or application to communicating with a professional, personal or social network using an established communication template and member chosen delivery preferences. Each member has a role and access rights defined by a template. Each member/user has the ability to communicate without device knowledge or knowledge of the device communication network or device type to which the communication will be originated, terminated or delivered. This works across all devices, mobile and broadband networks and does not require knowledge of particular members' personal information, preferences or contact details. The devices and communication networks may include text messaging, instant messaging (IM), e-mail, cellular voice mail and cellular communications, Twitter™, social network postings and blogs, as well as the public switched telephone network (PSTN), and numerous other communication technologies.

Figure 2:
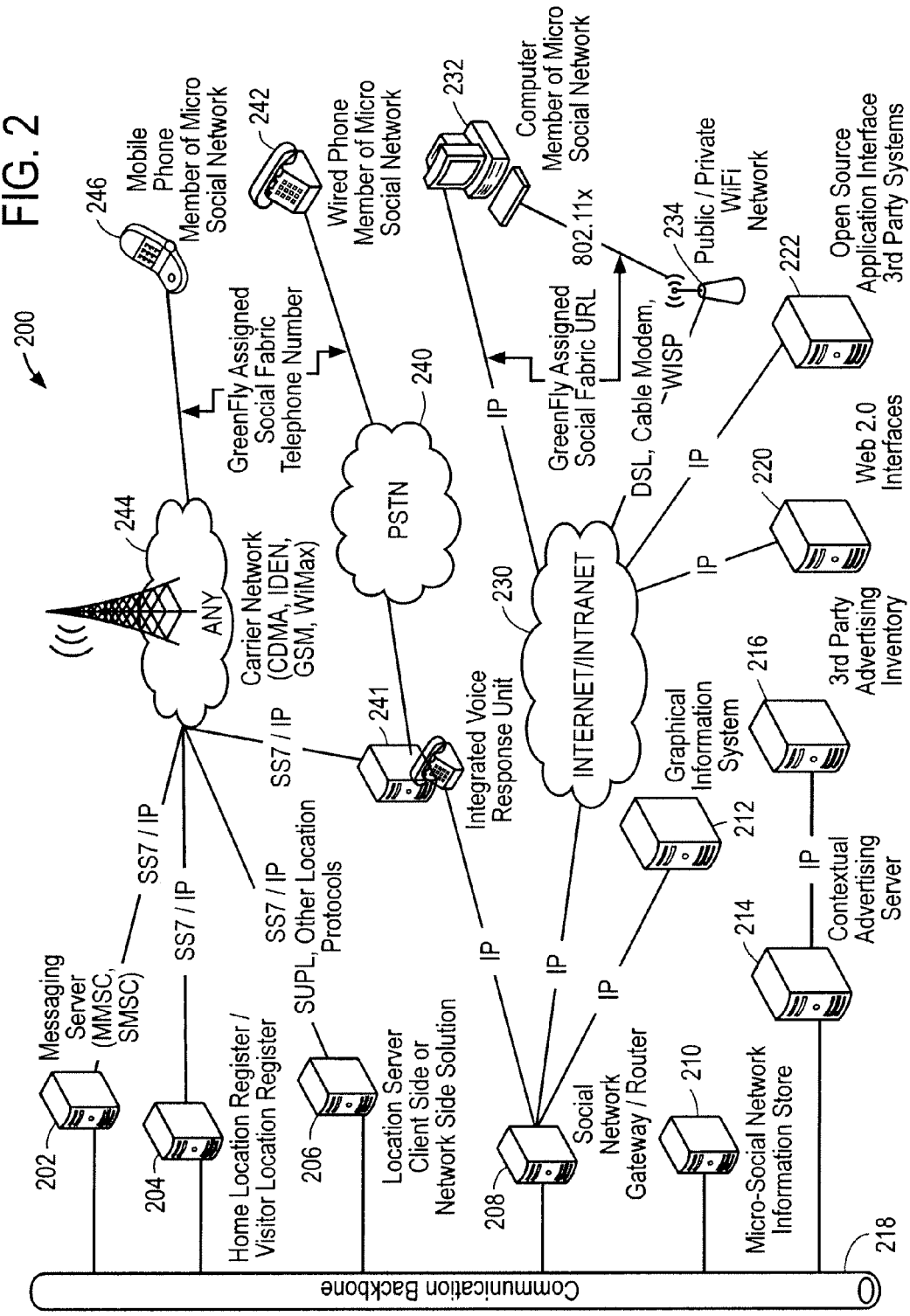
FIG. 2 is a network diagram of the relationships between the network elements of an embodiment of the invention.

Referring to FIGS. 1 and 2, it can been seen that the invention enables the seamless integration of mobile devices, computers, telephony, computer and wireless networks and services provided over the internet, intranets and more particularly the seamless integration of such networks and services while maintaining enhanced member privacy and control. Various Micro-Social Network (IPCN) members utilize a variety of compatible and incompatible communication devices to connect to corresponding communication networks.

FIG. 1 illustrates a IPCN System 100. The system 100 includes a set of end users 102. In one embodiment, the end users 102 include mobile consumers, first responders, and enterprise mobile users. The end users 102 interact with social fabric templates 104. A social fabric is a group of individuals. In one embodiment, a fabric is a group created through a web portal. Participants can join and interact with other group members based on their roles. Group sign-up, roles and permissions may be established via a computer or a mobile device.

Different social fabric templates may be defined for different vertical applications. For example, situational templates may be used to control groups responding to situations, such as fires, disasters, or other incidents. Another social fabric template may be used for non-profit organizations, such as families, sporting clubs, religious or educational groups. Other templates may be used for small business, affinity management and enterprises.

The social fabric templates 104 are configured to interact with a variety of networks 106, including cellular networks, internet networks, a public switched telephone network and any other communications networks employed by members of the social fabric group.

Such networks 106 are used to interface core services 108, which provide a gateway to underlying databases 110. The core services 108 may include management portals for social fabrics, a set of services and technology to create connectivity to cellular, wireline and other technologies, including Short Message Service Center (SMSC), Multimedia Messaging Service Center (MMSC), email servers, adapters for various Web 2.0 applications, web based graphical information systems, and services to provide locations based capabilities, and the like.

The underlying databases 110 may include instances of social fabric templates that specify roles, permissions, access rights, transactions, interface instances and user preferences. The databases 110 may also include container storage. Container databases may include communication profiles, fabric templates, references to external data, transaction status, payment methods and the like.

FIG. 2 shows a flow chart of the IPCN System 200 and its interactions to various networks and devices. The system 200 includes a set of servers, such as a messaging server 202, home location register/visitor location register server ("HLR/VLR") 204, location server 206, social network gateway 208, a social network information store 210 a contextual advertising server 214 and a third party advertising inventory server 216 linked by a communication backbone 218. In addition, an interface server 220 and open source application interface server 222 may share access to an internet or intranet 230.

Various client devices also populate the system 200. A computer 232 may access a public/private Wi-Fi network 234. A wired phone 242 may access the public switched telephone network 240, which includes an integrated voice response unit 241. Other client devices, such as a mobile phone 246 may access various carrier networks 244, such as CDMA, GSM and WiMax networks.

Figure 3:
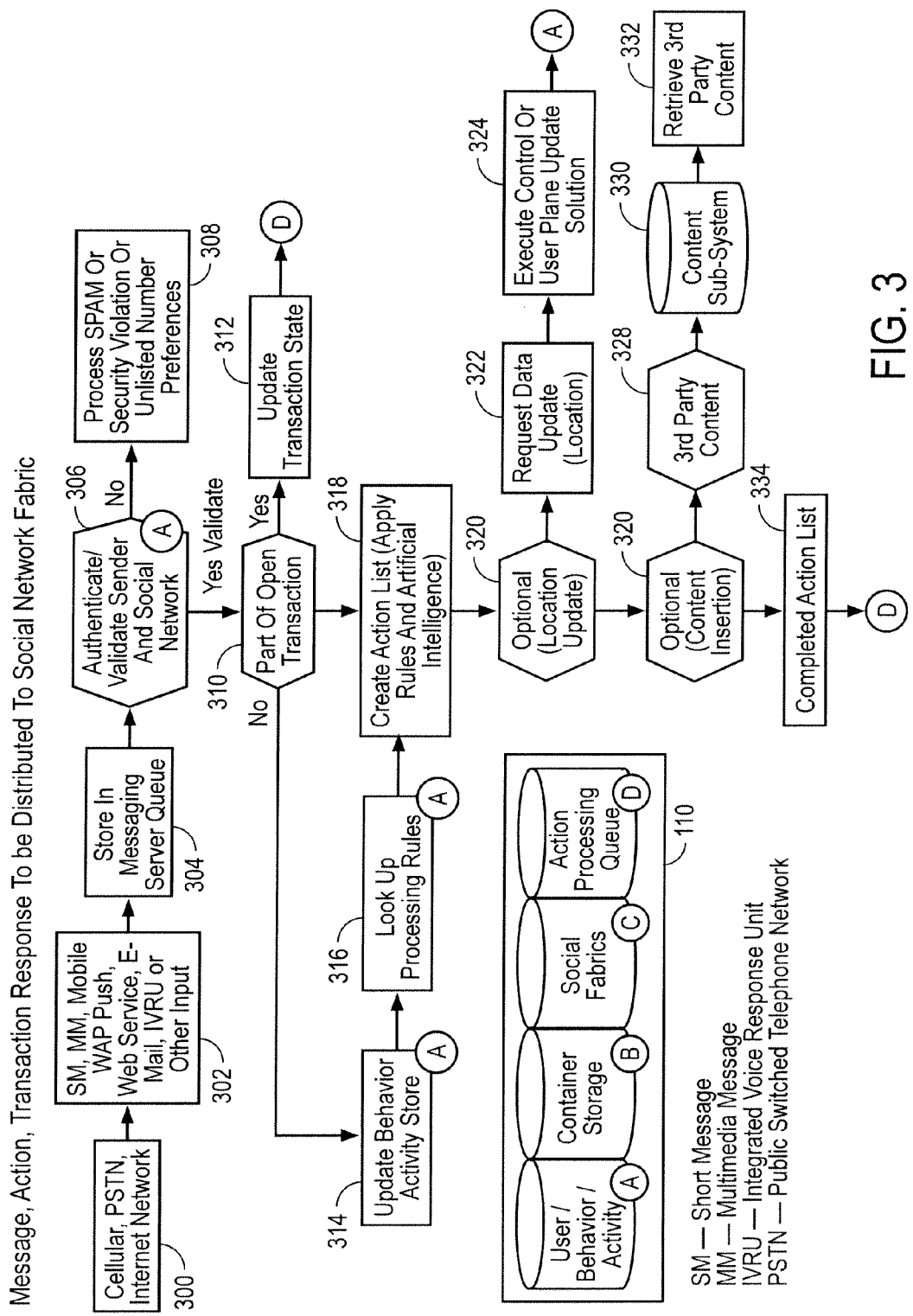
FIG. 3 illustrates processing operations associated with the system of FIG. 1.

FIG. 3 illustrates processing operations executed on the system 100 of FIG. 1. In this example, the social fabric identifier is entered into a communication network 300. The communication network may be a cellular, PSTN or internet network. The social identifier may be a telephone number, web address or other identifier. Alternately or in addition, the social fabric identifier may be entered in another format 302 (e.g., SM, MM mobile WAP push, etc.). The message maybe stored in a queue 304. An authentication operation is then applied to the message 306. Network communication authentication techniques are employed. If the authentication is not successful, a security violation is flagged 308. This processing will trap spam and other unwanted communications. If the message is authenticated, it is determined whether the message is part of an open transaction 310. If so, the transaction state is updated 312. If not, the behavior activity store is updated 314. Processing rules are then queried 316. The user/behavior databases 110 may be used to support these operations. An action list is then created 318. The action list specifies the modes of communications to be used for the recipients of the message.

The action list processing may include location information 320. If location information is to be used, location data is requested 322. The location information may then be used to alter the character of the delivered message 324.

The action list may also be supplemented with optional content insertion 326. If this option is invoked, third party content may be added 328. For example, the third party content may be an advertisement relevant to the message. The third party content may be retrieved from a content subsystem 330, which receives and processes third party content 332. This processing results in a completed action list 334, which forms the basis for the delivered content.

Figure 4:
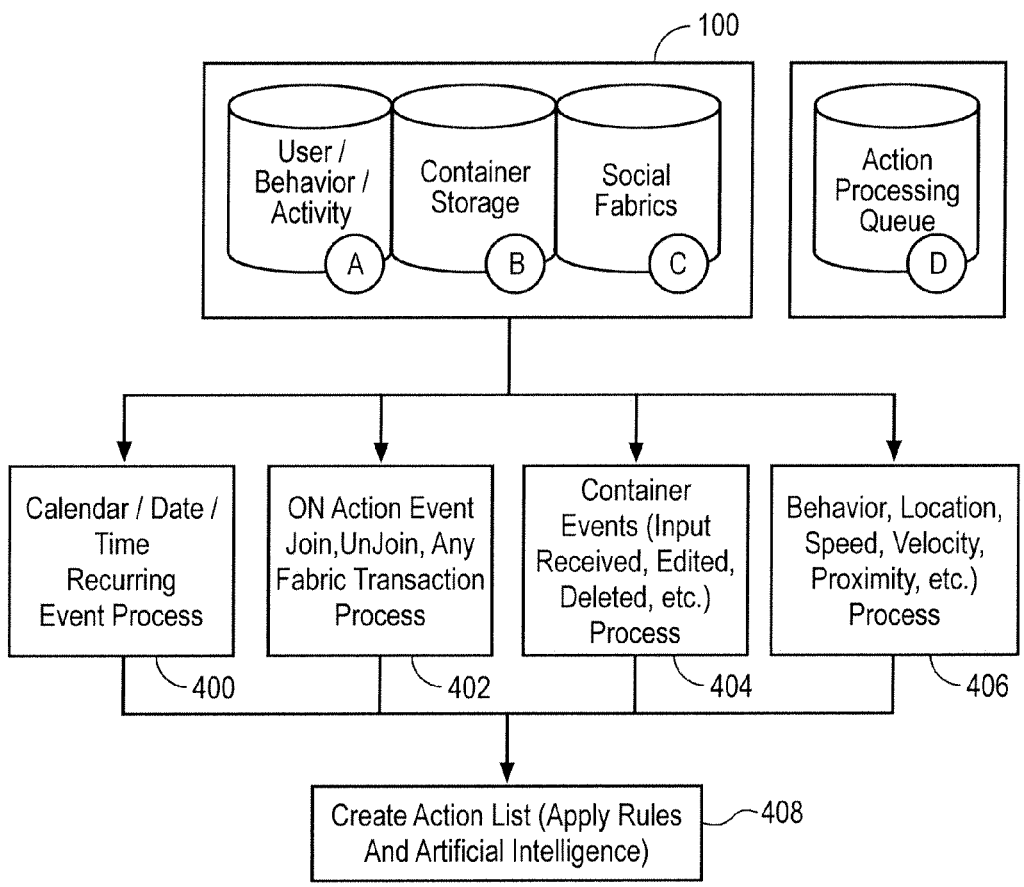
FIG. 4 illustrates processing operations associated with an event processor implemented in accordance with an embodiment of the invention; and, FIG. 5 illustrates an action queue processor implemented in accordance with an embodiment of the invention.

FIG. 4 illustrates how the databases 100 support various operations associated with the invention. The databases 100 support calendar/date/time and recurring event processing 400. The databases 100 also provide various join, un-join and fabric transaction processing 402. The databases also support container events 404. A container specifies a set of operations to be performed in connection with a message. For example, the message may be edited, deleted, augmented and the like. In addition, the databases 100 support event processing that relies upon additional information, such as end user behavior, location, speed, velocity, proximity and geo-fence location 406. Based upon this criteria, an action list is created 408.

Figure 5:
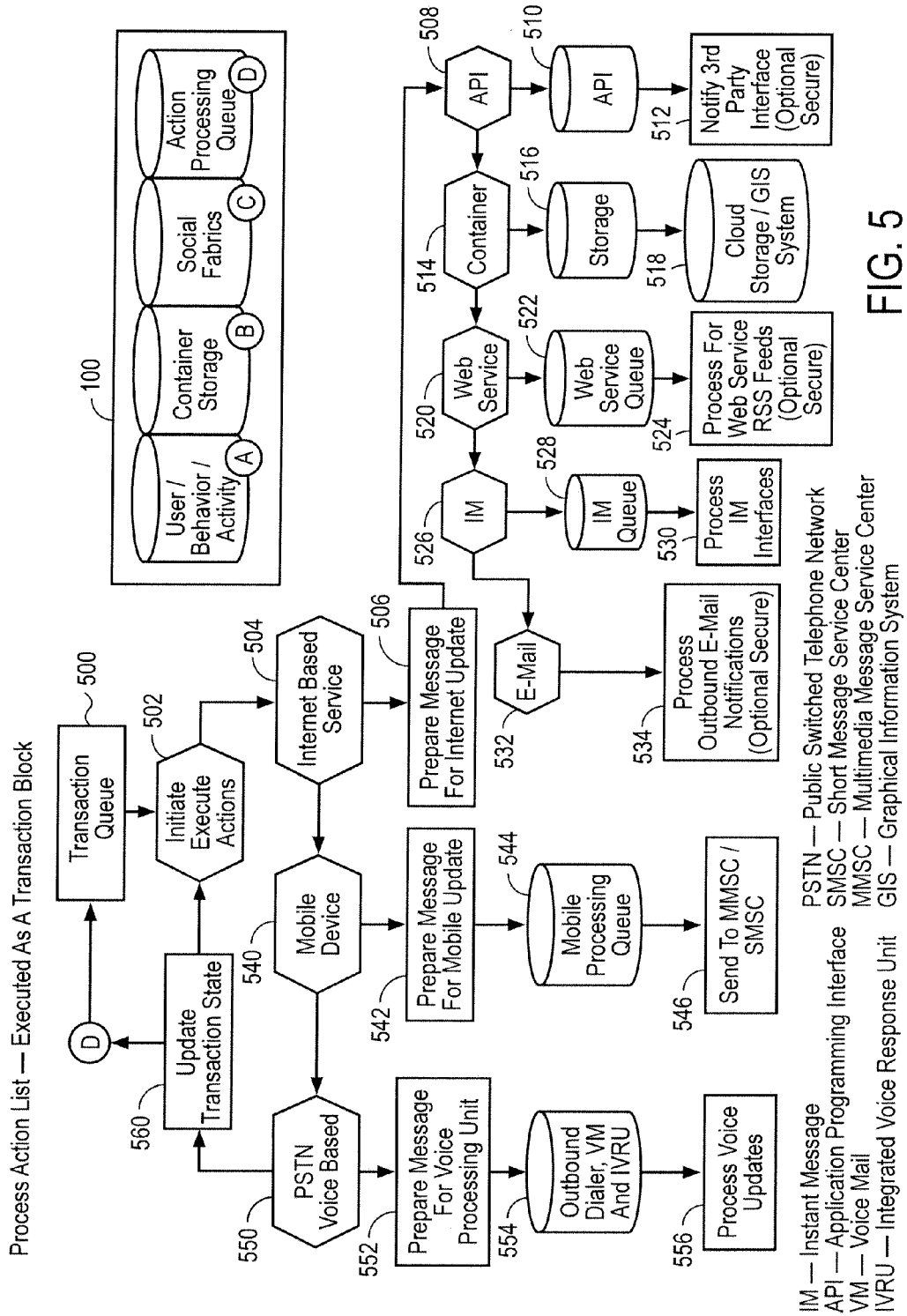

The action list created by the processing of FIGS. 3 and 4 is used as input to the processing of FIG. 5. FIG. 5 illustrates processing supported by the core service block 108 and databases 110 of FIG. 1. These components may be considered a communication gateway, which supports the operations of the invention. The action list is placed in a transaction queue 500. Action lists are retrieved from the transaction queue 500 to initiate execution 502. Execution is controlled by a processor associated with the communication gateway. In the event of an internet based service 504, the message is prepared for an internet update 506. If an application program interface (API) is required 508, the relevant API is accessed 510 and the recipient is notified via the API 512.

If the message is to be processed by a database container 514, database container storage 516 is accessed. The relevant container processes are applied to the message. As a result, the message is delivered in accordance with the rules, roles, permissions, access rights and preferences expressed in the container. The database container storage 516 may access cloud storage 518.

In the event of a web service member message, the appropriate web service 520 is invoked. The message is queued 522 and is subsequently processed in accordance with the web service parameters 524.

If the message specifies an instant message format for a member, an instant message service is invoked 526. The message is then queued 528 and is subsequently processed with the appropriate IM interfaces 530.

If the message is e-mail based to a member, an e-mail service 532 is invoked. The email message is then processed 534.

If the message is to be delivered to a mobile device 540, the message is prepared for the mobile device 542. The message is then queued 544 and delivered 546. Alternately, if the message is PSTN based 550, the message is prepared for voice processing 552 (e.g., text-to-speech). The message is then sent in accordance with the social fabric identifier, in this case a telephone number 554. The message is subsequently processed 556. After the message is processed, the transaction state is updated 560. The operations of blocks 506, 542 and 552 may be implemented as a dispatch unit associated with the communication gateway.

Thus, the invention integrates mobile communications, online presence, location and other attributes and services with traditional voice, email and mobile device capabilities by allowing families, peers, business and government organizations to communicate through the use of a single contact point that utilizes communication profiles, which may be established and maintained by the members. In an exemplary embodiment, seamless integration of incompatible interpersonal communication networks includes a set of software, computer, and network services that create a transparent personalized communication gateway. A user (member) manages and maintains their own specific communication preferences on how, where and when they want to receive communication and information from specific people or particular groups. This is done without a sender needing to have general or specific knowledge of the user's communication preferences or devices, thereby simplifying communications while maintaining member privacy and control.

The invention can filter, route, transform, notify, communicate and transact information as described herein utilizing all available wired and wireless networks allowing mobile devices, computers, computer and wireless networks, social networks, and software applications as a member of an interpersonal communication network (IPCN) such as a group, professional, personal social network, or (Micro-Social) Network. In one embodiment, an interpersonal communication network is assigned a social fabric identifier, such as a telephone number (TN) from a pool of available numbers. The social fabric identifier may also be in the form of Short Codes, Short Message Service, Multimedia Messaging Service, electronic mail, Integrated Voice Response Unit, Voice to Text Translation, World Wide Web based Services, Hyper Text Market Language (HTML) pages, or other machine and programming languages. Participation in the IPCN does not require a user/member to have an email address or even a computer. A user/member can participate with any mobile communication device that supports Voice and/or Short Message Services.

Each user/member sets their personal preferences. Preferences may include when to be reached and a target device for the receipt of information. Information delivery may be based on various parameters, such as who the information comes from, the priority assigned to the information, the role of the person within the organization, the type of the information (picture, text, voice, other web service update), the location, or may change or transition based on location, time of day or other network data elements provided by the system. For example, a template may specify that "When I am golfing, only accept messages from X, Y and Z."

An individual or organization creates a communication group called an IPCN or micro social network. The system only sets the rules for communication and enhances the capabilities of online social network forums by allowing their members to communicate to anyone. This may represent any arbitrary set of people that want continuing communication on some regular basis for some period of time on some topic, event or incident. Instead of funneling all information to one or more inboxes, the present invention provides a method to prioritize, route and store information based on what a member deems important. For example, updates from a boss may be automatically forwarded to a telephone as a text message regardless of the original message format.

The present invention provides the ability to forward communications and information to any place online and through any device. Opt-in member behavior and location related data from a mobile network is collected, which creates significant value to members, advertisers and content providers. This data may include location information, velocity, time-of-day, direction of travel, geo-fences, type of IPCN (micro social network) and behavioral information.

An embodiment of the invention automatically filters and organizes member specific information for each source and type of information, and allows members to prioritize, streamline and organize information based on the sender's role or identity so that the member will not be constantly interrupted. Consider the example of a family photo container with a social fabric number in the form of a ten digit telephone number. If a photo is sent to the number as a multimedia messaging service message, the container is configured to move the photo to a Flikr™ account and a copy is sent to a designated location for printing.

The IPCN can be organized based on any organization type, including without limitation, industry specific information, government, education, sporting, retail and wholesale. Individual network configurations can be pre-defined and selection of a type of network tailors or configures the IPCN for a specific purpose, which may include open source templates or other frameworks established through third party developers.

The IPCN is customized by setting and establishing preferences of the user/member which may include specific roles and responsibilities. Each user/member can create filters, forwarders, copiers, routers and simple to complex transactions that may include one or more members of the IPCN, other software, systems or third party applications. For example, upon joining a social fabric, the system may collect fees, dues or other information from the new member without the member taking any action. This long-duration transaction capability is designed to run over cellular networks as short message service messages or other protocols.

Preferences may be setup and established from any device in the IPCN. The preference settings allow each member to establish specific communication methods and modes without knowledge of the IPCN's organizer or other members' communications preferences becoming generally or specifically known, including their particular telephone number(s), email address(es), or methods of communication whether SMS, MMS, Voice, Text-to-Voice, Web Service including social networks and other notification systems including but not limited to MySpace™, Twitter™, FaceBook™, Flickr™ or numerous other web and mobile application services.

This allows for the virtualization of communication devices by providing a mnemonic and abstraction to the physical device from IPCN and other online services. A user/member can easily and quickly change physical device, telephone number, email address or other preference without multiple information re-entries or communication of such information to any other member/users in the social network fabric of the IPCN.

The present invention allows simple to complex work flow based transactions to be established using the modalities of individual communication methods. Such transactions can span disparate systems and devices which by the nature of the network could include without limitation mobile and fixed devices and utilize e-mail, SMS, MMS, web service, third party applications or other computer networks. Complex hierarchies of access permissions are not limited to the assignment of access, roles and permissions to specific members. Each member's role can be different on a social network basis and can be distributed across the network on the basis determined and allowed by the member. For example, in one network an individual may be a coach, in another network the individual may be a business executive, etc. This stands in contrast to systems where access rights are uniform across a network.

Intelligence is added to the IPCN network fabric with the addition of temporal information and triggers which can utilize location based on velocity, time-of-day, latitude and longitude, entering or exiting a geo-fence, addition of underlying topology, season, weather, and integration into third party location information or information management services to establish the activity, behavior, mode of travel. In addition, such information may provide an ability to track, locate, and utilize location based systems for use by the IPCN members, sponsors, advertisers and enterprises. This information includes the collection of real-time and non real-time information to establish member behavior, location, velocity, entering or exiting geo-fences, acceleration, speed-of-travel, altitude, time-of-day and interaction within one or more IPCNs. Such information can be used by members of the IPCN to customize and tailor their experience, be used to select a targeted or customized advertisement or other information to be presented to the member, or present other information that integrates one or more behaviors or data items collected from the IPCN in the aggregate or by member. Additional transactions include, without limitation, the delivery of content, such as promotions, coupons, and the ordering and/or purchase of merchandise and services enabled by the IPCN.

The IPCN provides for the storage of information based on containers/folders of information. Such information includes any type of modern digitally formatted data. For example, a Club Sports Organization may have several sports and many teams in an arbitrary hierarchy or in a organizational model for large enterprises. In addition to the capability to embed other IPCNs folders, support is preferably provided for dashboards, video, images, news feeds, blogs, text from SMS, complex objects including MMS messages, HTML, calendars, tasks, word processing documents, maps and other location information, directions, coupons, advertisements, promotions, preferences and rules that monitor, notify, forward, copy, transform and route information based on the source, content, type, or other network available information including who the information comes from, the priority assigned to the information, the role of the person within the organization, the type of the information (picture, text, voice, other web service update), the location, time of day or other network data elements provided by the Communication System. Other events or triggers may include entering, exiting a geofence, urgent messages, alerts, and transaction requests, whether financial or work-flow based.

When the communication system receives information, it validates and authenticates the information. This is done using the stored rules expressing the IPCN preferences, including the ability to send, copy, route or move the information to almost any internet service that they participate in from computers and auxiliary networks, web storage, electronic mail, web services including other social networks, and corporate or government intranets. The present invention can be used for transactions including approvals, work-flow and order processing.

The present invention analyzes and automatically validates the identities of the members using information available from the network, such as MSID and the MIN. This approach eloquently bypasses the problems with authenticating users with user name and password by using the mobile communication network as the primary authenticating mechanism.

Since the present invention operates as part of the set of operators certified to operate globally on all the available communication networks including GSM, CDMA, Wi-Max, and open and closed Wi-FI networks. There are differences in implementation from GSM and CDMA networks, but the quality and security level of the information is equal or higher than traditional e-mail and password schemes deployed today by most applications. Additionally, this method of authentication does not require a login step from a mobile device, but it can be added for additional protection and security (a second level of security). A safety security word, challenge question and response, etc. may be used in the event of lost or stolen equipment.

The present invention can automatically downgrade content as necessary in real-time by understanding and capturing the mobile device or other computing device's capabilities and applying necessary changes for the content to be delivered to different user devices. Applications adapt to the capabilities of the user's device (handset, etc.) and network access capabilities. This is important where the user may not have a data connection, background application processing, GPS chipset or other particular functionality available. This automatic self-degradation feature enables support for CDMA, GSM, IDEN and other types of devices (handsets) simultaneously with seamless interoperability, while providing member privacy and control. For example, if a rich format content message is sent to a mobile device which lacks the capability to receive that content, then the content that can be displayed will be reformatted for the device and the additional content will be referenced for retrieval from the IPCN by other devices or methods. The system will automatically dynamically reformat and repurpose the information based on the receiver's services capabilities.

The present invention provides the ability for mobile devices from separate and disparate carriers and technologies to seamlessly interoperate together in an IPCN Fabric. Exemplary applications for this particular capability include first responders, fire and safety, homeland security and numerous other organizations. Currently, member of these organizations rely on multiple incompatible technologies (beepers, cell phones, and many other wireless and wired communication devices). Through the use of a social fabric network identifier (e.g., a specific telephone number), each member can instantly join and participate in a project, event or incident based on an assigned role. For example, first responders and other emergency and healthcare personnel could be pre-credentialed. Afterwards, registering with a cellular device and a shared secret results in an automatically assigned role within a social fabric network.

The present invention provides a multi-technology communication link that will work with any signal available on any network and include location services, secure data capabilities and more. When used along side any standard (primary) mobile communication device, the invention provides a real-time solution that crosses multiple organizations, carriers and capabilities, thereby linking groups and organizations which do not have integrated communication networks.

The present invention provides the ability to automatically join, become active, or transition from off-line to on-line in a IPCN by entering or exiting a geo-fence or other trigger based on information available in the communication subsystem. This capability can be restricted to the IPCN or any other sub category.

Triggers and probability values in the present invention are constructed with information provided by the network, which could include past events (history) through a combination of movement (prior locations), time-of-day, social activity as well as other information. Advertisers, enterprises and various other organizations could use this information to create complex information selection criteria from behavioral data. For example, modes of transportation can be determined by merging changes of velocity, current speed, time-of-day, and location lookup to determine the mode of transportation (e.g., bicycle, foot, train, plane). In many cases the particular activity being performed may be determined by analysis of the time-of-day, prior logged activities and the physical address or location of a user. For example: (1) in-transit-by-car, in-city, velocity 5 MPH, time-of-day, day-of-week, vector-towards previous retail markets yields an extremely high probability of lunch-time transit-by-car; (2) location on Golf-Course, time-of-day (daylight), current temperature/weather conditions (+40° F., not raining) yields playing golf or weather conditions (<40° F., snowing) yields walking the course in the snow whereby these variables are exposed to the IPCN fabric for advanced targeting, filtering and messaging.

An advertising based model for non-professional IPCNs (families, social groups, sports, religious, education, small business, etc.) can generate revenue. For enterprise, government, public safety, first responders and others, a non advertising monthly service agreement based on the features needed can be provided.

Custom crafted advertising content may be targeted and delivered for an activity. This is possible using mobile information (location, geo-fence, velocity, time-of-day), affinity program information (purchase history), and opt-in social network information (communicating about a specific activity).

Communication preferences, capabilities and information are managed by an opt-in IPCN manager. The IPCN provides the member's professional and personal gateway for communication within a community. Knowledge of other community member's email address, telephone number or communication capability is not required. The present invention is aware of the communication criteria and requirements and automatically adjusts for the communication preferences of the member.

In one exemplary embodiment, a sports coach sends a text message from a cell phone to the team's network (Urgent "Practice Cancelled"). The system interprets this to be an urgent message and forwards this to all members based on their urgent preferences (including IM, Email, Text, Audio, Video, 3rd party applications, etc. . . . ) for that IPCN and the individual member's role. All of the interaction can be driven by the end user where their particular communication preferences seamlessly integrate into all popular web-based, mobile and traditional methods of communication. A significant paradigm change from managing devices and inboxes to managing and routing information based on member preferences, type of information, priority, the role of the member in the IPCN makes this capable, without the requirement of a stand-alone computer, or even an email address.

Using this system, consumers and employees gain device and service independence with prioritization of information however they want it: e-mail, voice, picture, text, instant messages or online services with automatic seamless conversions between services, SPAM-free, identity management utilizing a robust filtering and rules engine.

Brands, advertisers and ad agencies can target ad content and promotion using consumer behavior, location, velocity, time-of-day, activity and other network provided mobile data elements on an opt-in basis.

Enterprises automatically manage and prioritize information in a totally inter-operational framework, which includes network information including location, presence, behavior and web services; regardless of source or format creating a highly efficient organization.

The following examples are provided to further appreciate the capabilities and functionality of the present invention. A soccer coach sends a text message from a cell phone to the team's IPCN "[Urgent] Practice Cancelled". The IPCN interprets this to be an urgent message and forwards this to all members based on individual preferences.

In another example a Communication Status Trigger is sent by the member/user. When I am playing golf, send all voice-calls to my-primary-voice-mail using golf-prompt except for urgent-status ALL and Family.

Such actions are established through a rules engine or through a GUI interface on a mobile device, other computing device or through other user interfaces.

A message may be defined as follows:
a. When—behavior based trigger
b. I—social network of the individual, could be family or other social network name, number or reference
c. Am—Filler word ignored d. Playing—Keyword to weight the time-of-day and other factors.
e. Golf—Keyword calculated by the system based on several factors.
f. Send—Keyword meaning to forward something
g. Voice-Calls—keyword of a communication type
h. To—filler word ignored
i. my-primary-voice-mail—container that holds voice recordings names by the user.
j. Using—Keyword for a method or macro or modifier
k. Prompt Golf—replaces the default voice mail prompt
l. Except—Keyword list of exceptions
m. Urgent-Status—Keyword for Urgent Flag is set on message
n. ALL—from all social networks
o. And—ignored
p. Family—a (Micro-Social)-network consisting of the immediate family.

Rules are processed based on the source of the transmitting network to eliminate conflict in the rules processing. Because of potential conflicts, rules must be processed in a particular order and have the option to be stopped after the execution of one or more rules.

Numerous modifications and alternative embodiments of the invention will be apparent to those skilled in the art in view of the foregoing description. The IPCN can employ an intelligent user/member speech interface.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of network delivery of electronic messages, comprising:
    creating an action list from templates corresponding to a group identifier, wherein the templates characterize the structure of a group specified by the group identifier, wherein the structure of the group is specified through roles, permissions and transaction rules for communicating with each individual associated with the group identifier and wherein a message recipient specifies communication preferences for receiving information; and
    executing electronic message delivery instructions of the action list for each individual associated with the group identifier, wherein the electronic message delivery instructions specify instructions to be processed by disparate communication networks, wherein the disparate communication networks include at least two of a text messaging network, an instant messaging network, an email network, a cellular network, a social network and the public switched telephone network.

2. The method of claim 1 wherein the disparate communication networks provide authentication operations.

3. The method of claim 1 further comprising opt-in membership settings.

4. The method of claim 1 further comprising processing location related data.

5. The method of claim 4 further comprising tailoring an electronic message based upon the location related data.

6. The method of claim 1 further comprising processing message recipient movement information.

7. The method of claim 6 further comprising tailoring an electronic message based upon the message recipient movement information.

* * * * *